United States Patent [19]

Shimanuki et al.

[11] Patent Number: 4,991,910
[45] Date of Patent: Feb. 12, 1991

[54] ANTI-LOCK CONTROL SYSTEM FOR MOTOR VEHICLES

[75] Inventors: Haruki Shimanuki, Kasukabe; Yuji Matsubara, Kazo; Takao Maki, Kitakatsushika, all of Japan

[73] Assignee: Akebono Brake Industry Co., Ltd., Japan

[21] Appl. No.: 278,618

[22] Filed: Dec. 1, 1988

[30] Foreign Application Priority Data

Dec. 4, 1987 [JP] Japan .................. 62-305586

[51] Int. Cl.[5] .................. B60T 8/68
[52] U.S. Cl. .................. 303/109; 303/105; 303/108; 364/426.02
[58] Field of Search .................. 303/100, 103, 105, 108, 303/109, 110, 96, 97; 188/181 A, 181 C; 364/426.01, 426.02

[56] References Cited

U.S. PATENT DOCUMENTS

| | | | |
|---|---|---|---|
| 3,912,337 | 10/1975 | Ochiai | 303/109 |
| 4,053,188 | 10/1977 | Jonner | 303/109 |
| 4,384,330 | 5/1983 | Matsuda et al. | 364/426.02 |
| 4,673,226 | 6/1987 | Every et al. | 364/426.02 X |
| 4,762,375 | 8/1988 | Maki et al. | 303/109 |
| 4,763,260 | 8/1988 | Sakuma et al. | 303/105 X |
| 4,763,960 | 8/1988 | Uchida et al. | 303/109 X |
| 4,773,714 | 9/1988 | Shimanuki et al. | 303/108 |
| 4,825,371 | 4/1989 | Hoachi et al. | 364/426.02 |
| 4,849,890 | 7/1989 | Inoue et al. | 303/105 X |

FOREIGN PATENT DOCUMENTS

0050862  3/1986  Japan .................. 303/109

Primary Examiner—Douglas C. Butler

[57] ABSTRACT

An anti-lock control system for motor vehicles is designed to have its computed vehicle speed modified as the motor vehicle is braked. In this invention, the computed vehicle speed persists along a reference deceleration gradient line representing a predetermined acceleration follow-up limit measured with respect to the wheel speed for a predetermined period of time from a point of time when the deceleration of the computed vehicle speed reaches the reference deceleration gradient line for the first time after the motor vehicle was braked. Thereafter, the computed vehicle speed is modified to follow a deceleration gradient line with a gradient that is gentler than that of the reference deceleration gradient line, until a threshold speed is reached, which is lower by a predetermined amount than and follows the computed vehicle speed with such a speed difference.

5 Claims, 7 Drawing Sheets

PRESSURE BUILDUP STARTING POINT DETERMINING ROUTINE

FIG. 5 Vv COMPUTING ROUTINE

MODIFIED Vv GRADIENT GENERATING ROUTINE

FIG. 8

Vv MODIFYING ROUTINE

ANTI-LOCK CONTROL SYSTEM FOR MOTOR VEHICLES

BACKGROUND OF THE INVENTION

1. Field of the Invention

This invention relates to improvements in or relating to an anti-lock system for a motor vehicle, which is adapted to prevent the wheels of the motor vehicle from being locked during a braking operation.

2. Description of the Prior Art

There has conventionally been proposed an anti-lock system of the three-channel type, for example, which is arranged to secure improved steering performance and running stability of a motor vehicle during a braking operation, while at the same time shortening the braking distance. With such a conventional anti-lock system, signals representing respective wheel speeds Vw1 to Vw4 are provided on the basis of pulse signals derived from speed sensors associated respectively with the wheels; the signals representing the front lefthand wheel speed Vw1 and front righthand wheel speed Vw2 are passed to first and second control logic circuits as first channel speed Vs1 and second channel speed Vs2 respectively; and the lower one of the rear lefthand wheel speed Vw3 and rear righthand wheel speed Vw4 is selected (referred to as "select low" hereinafter) and passed to a third control logic circuit as a third channel speed Vs3. Furthermore, the highest one of the respective wheel speeds Vw1 to Vw4 is selected (referred to as "select high"), and the thus selected highest wheel speed has its acceleration and deceleration limited in the range from +1G to −1G (G is a unit of acceleration equal to the standard acceleration of gravity) to set up a computed vehicle speed Vv, approximate to the actual wheel speed, which in turn is passed to the respective control logic circuits, as disclosed in U.S. Pat. No. 4,741,580. With the respective control logic circuits, a threshold speed Vt is set up which is lower by a predetermined amount ΔV (ΔV=5 km/hour, for example) than and follows the computed vehicle speed Vv (Vt=Vv−ΔV); the aforementioned first to third channel speeds Vs1 to Vs3 are regarded as wheel speed Vw to be controlled (referred to simply as "wheel speed Vw" hereinafter); pressure increasing valves and pressure reducing valves associated with the respective channels are on-off controlled based on the wheel speed Vw, acceleration Vw of the wheel speed, computed vehicle speed Vv, threshold speed Vt and so forth; and in this way, anti-lock control including periodic buildup, reduction and holding of the brake fluid pressure, one cycle of which comprises the time period from a pressure buildup starting point to the next one, is effected to control the wheel speed Vw, as shown in FIG. 1.

Figure 1:
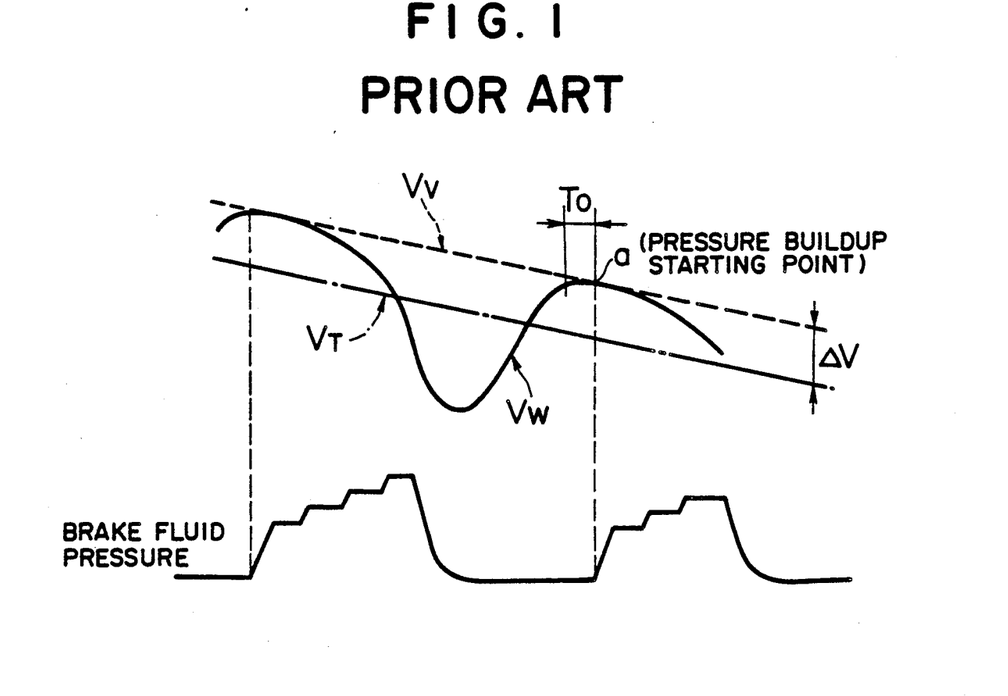
FIGS. 1 and 2 are views useful for explaining the prior-art anti-lock control system for motor vehicles.
Figure 2:
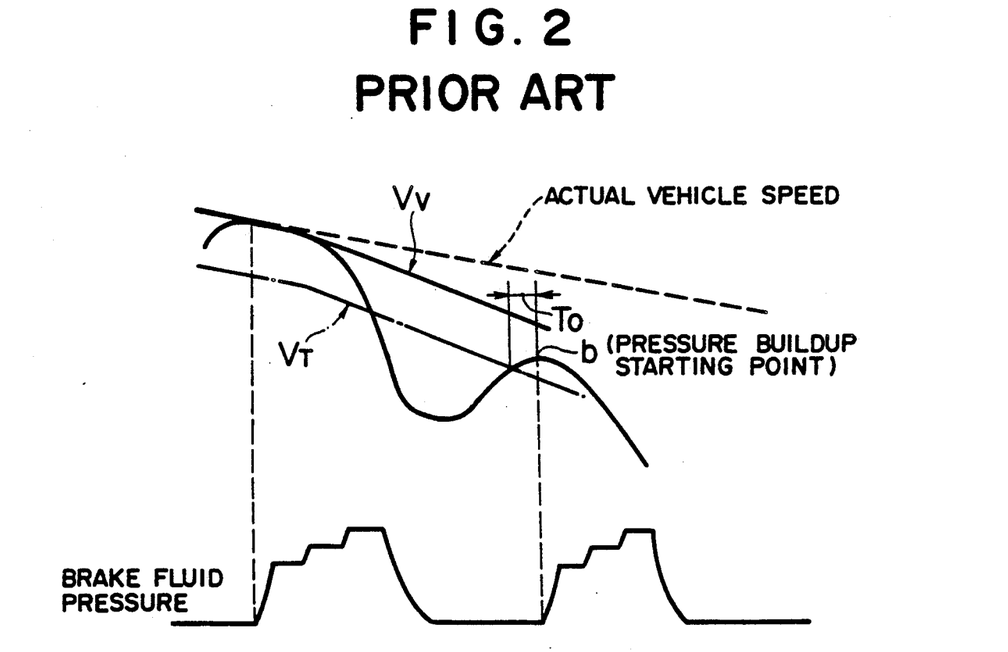

With each cycle of anti-lock control as shown in FIG. 1, in a pressure buildup starting point waiting mode, brake fluid pressure buildup is started at a point where the following conditions (1) and (2) are met at the same time:

(1) the wheel speed is higher than the threshold speed Vt; and (2) it is detected that the wheel speed Vw has reached a high peak or a level close thereto.

In this case, the fact that such a condition that the acceleration or deceleration Vw of the wheel speed is lower than a predetermined acceleration or deceleration Go (including the case where Vw<0) persists for a period of time equal to or longer than a predetermined time To, is regarded as the detection of the wheel speed Vw having reached a high peak or a level close thereto as mentioned above in the paragraph (2).

However, such a conventional anti-lock control system is disadvantageous in the below-mentioned points.

With the conventional system, as mentioned above, the highest one, VwH, of the four wheel speeds is selected (select high); in the case where the acceleration or deceleration of the highest wheel speed VwH is within the range from +1G to −1G, for for example, this speed VwH is used as computed vehicle speed Vv; and in the case where the acceleration or deceleration of the highest wheel speed VwH is outside the range from +1G to −1G, for example, a speed having an acceleration of +1G or a deceleration of −1G is set up as the computed vehicle speed Vv. Thus, in case the speeds of four wheels running on a road surface of a low friction coefficient are dropped so that all the wheels tend to be locked at the same time, the computed vehicle speed Vv decreases with a deceleration gradient of −1G that is one of the follow-up limits therefor, and the threshold speed Vt is lower by ΔV than and follows the computed vehicle speed Vv. In this way, it happens that the wheel speed Vw, even when it has not yet recovered sufficiently and is in a recovering process, goes above the threshold speed Vt so that a high peak of the wheel speed Vw occurs, and thereupon the aforementioned pressure buildup starting conditions (1) and (2) are both satisfied at the same time so that brake pressure buildup is started, as a result of which the wheel speed Vw is further dropped, and early-locking of the wheels tend to be caused.

Especially with a direct-coupled 4-wheel drive system, if, in the course of one wheel speed being recovered after a reduction of the brake fluid pressure, the other wheel speed is increased abruptly, then due to interference between the wheels, said one wheel speed is decreased temporarily; and thereafter, when said one wheel speed is changed from decrease to increase, said other wheel speed is decreased temporarily. In this way, the wheel speed Vw moves toward recovery while changing slightly due to such interference as mentioned above. With a front wheel drive system, the speed of the front wheel when the gear is engaged, moves toward recovery while changing slightly under the influence of engine brake. Especially with a motor vehicle of the direct-coupled 4-wheel drive or front wheel drive type, even when the brake fluid pressure is being reduced or held, it often happens that temporary increase and decrease in the wheel speed Vw occur repetitively while the wheel speed is on the way toward recovery, so that a high peak of the wheel speed Vw is more likely to be detected. Thus, the aforementioned drawback turns out to be more serious.

SUMMARY OF THE INVENTION

Accordingly, it is an object of the present invention to provide an anti-lock control system for motor vehicles, which is so arranged that even when the speeds of four wheels running on a road surface of a low friction coefficient drop at the same time, no pressure buildup is started insofar as the wheel speed Vw remains low, while when the wheel speed Vw has recovered sufficiently, pressure buildup is started, thereby preventing occurrence of early-lock.

Briefly stated, according to an aspect of the present invention, there is provided an anti-lock control system for motor vehicles, wherein when the computed vehicle speed Vv persists along a reference deceleration gradient line representing a predetermined acceleration follow-up limit of the computed vehicle speed with respect to the wheel speed for predetermined period of time from a point of time when the deceleration of the computed vehicle speed Vv reaches the above-mentioned reference deceleration gradient line for the first time after the motor vehicle was braked, the computed vehicle speed Vv is modified so as to move along a deceleration gradient line that is gentler than the reference deceleration gradient line, thereby increasing the aforementioned threshold speed Vt.

According to the present invention, as mentioned above, when a state wherein the deceleration of the computed vehicle speed Vv is higher than a predetermined deceleration follow-up limit persists for a predetermined period of time, the computed vehicle speed Vv is modified to increase the threshold speed so that even when the speeds of the four wheels running on a road surface of a low friction coefficient drop at the same time, no brake pressure buildup is started before a sufficient recovery of the wheel speed Vw occurs, thereby making it possible to prevent abrupt drop of the wheel speed Vw and occurrence of early-lock.

Other objects, features and advantages of the present invention will become apparent from the ensuing description taken in conjunction with the accompanying drawings.

DESCRIPTION OF THE PREFERRED EMBODIMENTS

Figure 3:
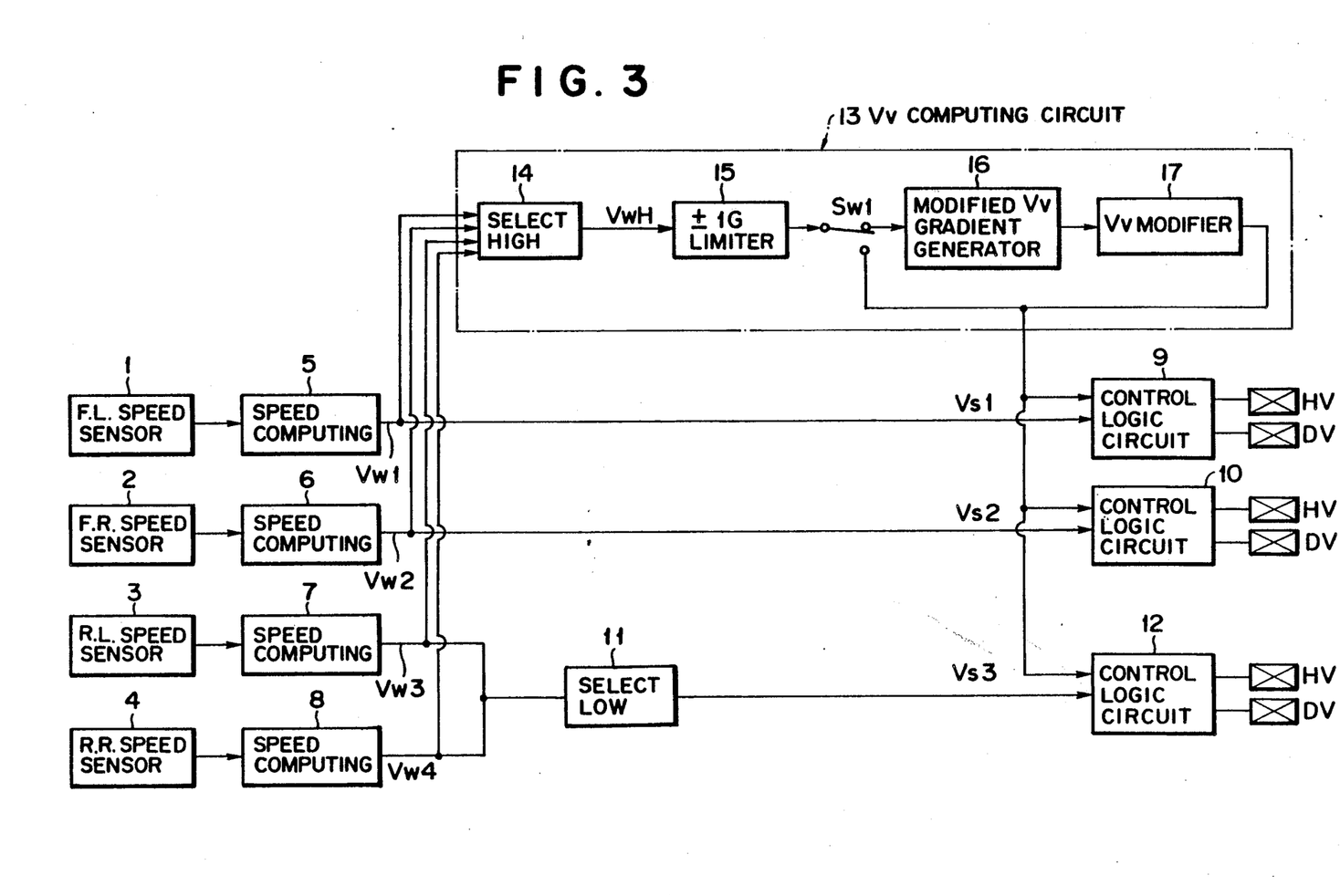
FIG. 3 is a block diagram illustrating the anti-lock control system according to an embodiment of the present invention.

Referring to FIG. 3, there is shown, in a block diagram, the three-channel type anti-lock control apparatus to which the system of this invention is applied, wherein outputs of wheel speed sensors 1 to 4 are passed to and computed in computing circuits 5 to 8 from which signals representing wheel speeds Vw1 to Vw4 are derived. The front lefthand wheel speed Vw1 and front righthand wheel speed Vw2 are passed to first and second control logic circuits 9 and 10 as first and second channel speeds Vs1 and Vs2 respectively, and the lower one of the rear lefthand wheel speed Vw3 and rear righthand wheel speed Vw4 is selected in a select-low circuit 11 and passed to a third control logic circuit 12 as a third channel speed Vs3.

Further, the signals representing the wheel speeds Vw1 to Vw4 are passed to a computed vehicle speed computing circuit 13 which comprises a select-high circuit 14 arranged to select the highest one, VwH, of the four wheel speeds Vw1 to Vw4; a limiter circuit 15 arranged to limit the acceleration of the highest wheel speed VwH in the range from +1G to −1G; a modified computed vehicle speed gradient generating circuit 16 arranged, when the computed vehicle speed Vv reaches a reference deceleration gradient line representing a predetermined deceleration follow-up limit for the first time after the motor vehicle is braked, to generate three different modified deceleration gradient lines the gradients of which are more gentle than that of the reference deceleration gradient line; and a computed vehicle speed modifying circuit 17 arranged to modify the computed vehicle speed Vv successively. Switch Sw1 is arranged such that a movable contact is disposed in engagement with a fixed contact coupled to the modified Vv gradient generating circuit 16, which is connected to the Vv modifying circuit 17, for a period of time from a point when the motor vehicle is braked to a point when brake fluid pressure buildup is started for the first time in any of the three channels, and thereafter the movable contact is brought into engagement with another fixed contact which is not coupled to the circuit 16. This is because for the second and succeeding cycles of control subsequent to the first brake pressure buildup starting point, unlike for the first cycle of control, controlled brake fluid pressure buildup is effected so that the possibility that the four wheels are locked at the same time is precluded.

When the movable contact of the switch Sw1 is disposed in engagement with the fixed contact thereof which is coupled to the modified Vv gradient generating circuit 16 connected to the Vv modifying circuit 17, the output of the Vv modifying circuit 17 is passed to the control logic circuits 9, 10 and 12. When the movable contact of the switch Sw1 is disposed in engagement with the other fixed contact thereof which is not coupled to the modified Vv gradient generating circuit 16, on the other hand, the output of the limiter circuit 15 is passed directly to the control logic circuits 9, 10 and 12.

In the respective control logic circuits 9, 10 and 12, a reference wheel speed Vr is computed which is lower by a predetermined amount $\Delta V1$ than and follows the respective channel speed with such a speed difference, and which decreases linearly with a deceleration gradient $\theta$ of $-1.1G$ from the point of time when the deceleration Vw of the wheel speed reaches a predetermined threshold level, say $-1.1G$; furthermore, a threshold speed Vt is computed which is lower by a predetermined amount $\Delta V2$ than and follows the computed vehicle speed Vv; and still furthermore, accelerations or decelerations V̇s1 to V̇s3 of the respective channel speeds are computed. The wheel speed Vw is compared with the reference wheel speed Vr and threshold speed Vt to determine a point when buildup, reduction or holding of the brake fluid pressure is started, and based on the result of the determination, a pressure increasing valve HV and pressure decreasing valve DV associated with each channel are opened and closed in a controlled manner, and thus anti-lock control is effected.

Figure 4:
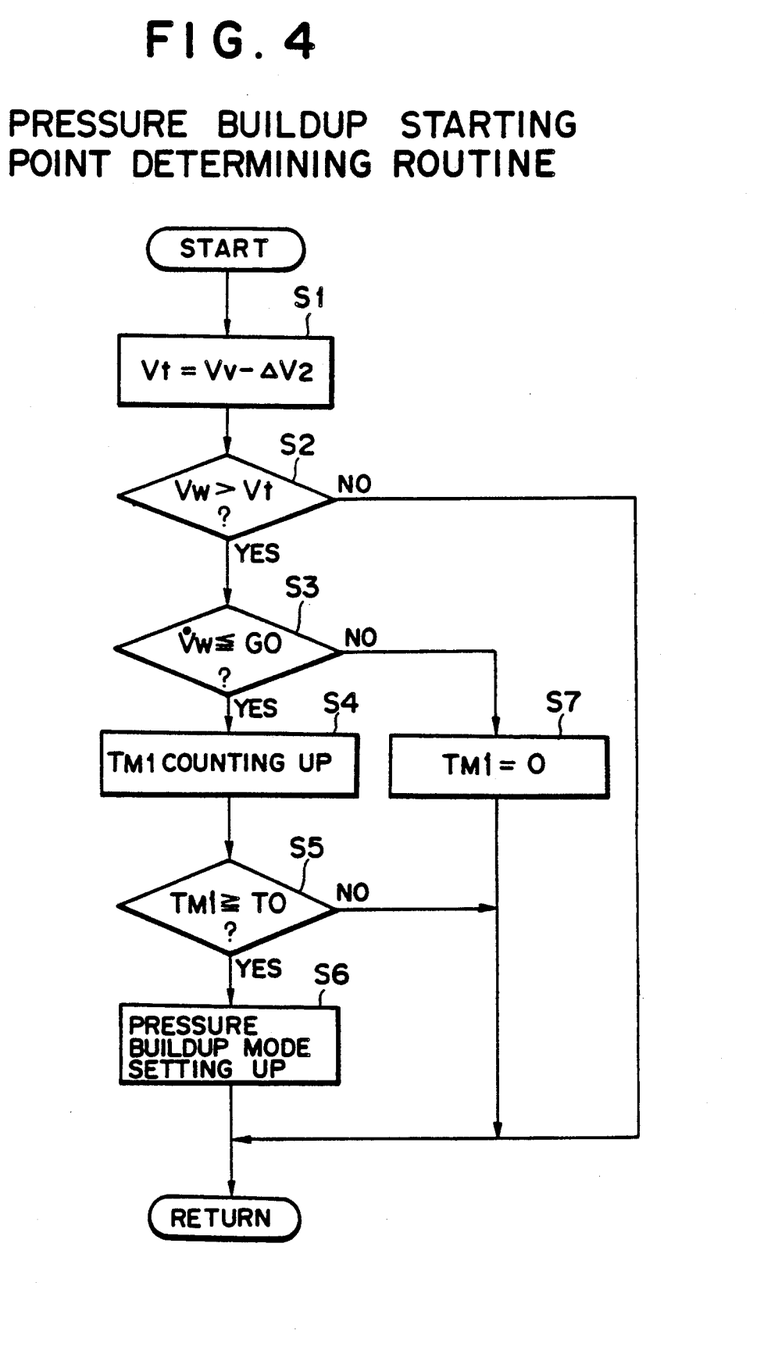
FIG. 4 is a flow chart showing the brake fluid pressure buildup starting point determining routine according to the embodiment of the present invention.

The flow chart of FIG. 4 shows how the determination of a point when brake fluid pressure buildup is started, is effected in the control logic circuits 9, 10 and 12. More specifically, at step S1, the threshold speed Vt is sought by subtracting the predetermined amount ΔV2 from the computed vehicle speed Vv. The process proceeds to step S2 where judgment is made as to whether the wheel speed Vw is higher than the threshold speed Vt. If the result of the judgment is "YES", then the process proceeds to step S3 where the acceleration V̇w of the wheel speed Vw is compared with a predetermined value G0, and if the acceleration V̇w is equal to or higher than the value G0, then counting-up of time TM1 set on a timer is started at step S4. Subsequently, the process proceeds to step S5, and if a predetermined period of time T0 the time TM1 has elapsed, then a pressure buildup mode is set up at step S6. If the predetermined period of time has not elapsed yet, then the process returns to step S1. If the result of the judgment made at step S2 is "NO" then the process returns to step S1. If it is judged at step S3 that the acceleration or deceleration V̇w is higher than G0, then the process proceeds to step S7 where the time set on the timer is made to be equal to 0, and then the process returns to step S1.

According to this embodiment of the present invention, in order that buildup of the brake fluid pressure can be started, it is required that a first condition that the wheel speed Vw is higher than the threshold speed Vt, and a second condition that the acceleration of the wheel speed Vw remains below the predetermined acceleration G0 continuously for the predetermined period of time T0 and it is detected that the wheel speed Vw reaches a high peak or a level close thereto, be satisfied at the same time. As will be appreciated, of the steps S1 to S6 in FIG. 4, the step S2 is concerned with the judgment of the above first condition, and the steps S3 and S5 are related to the judgment of the foregoing second condition.

Figure 5:
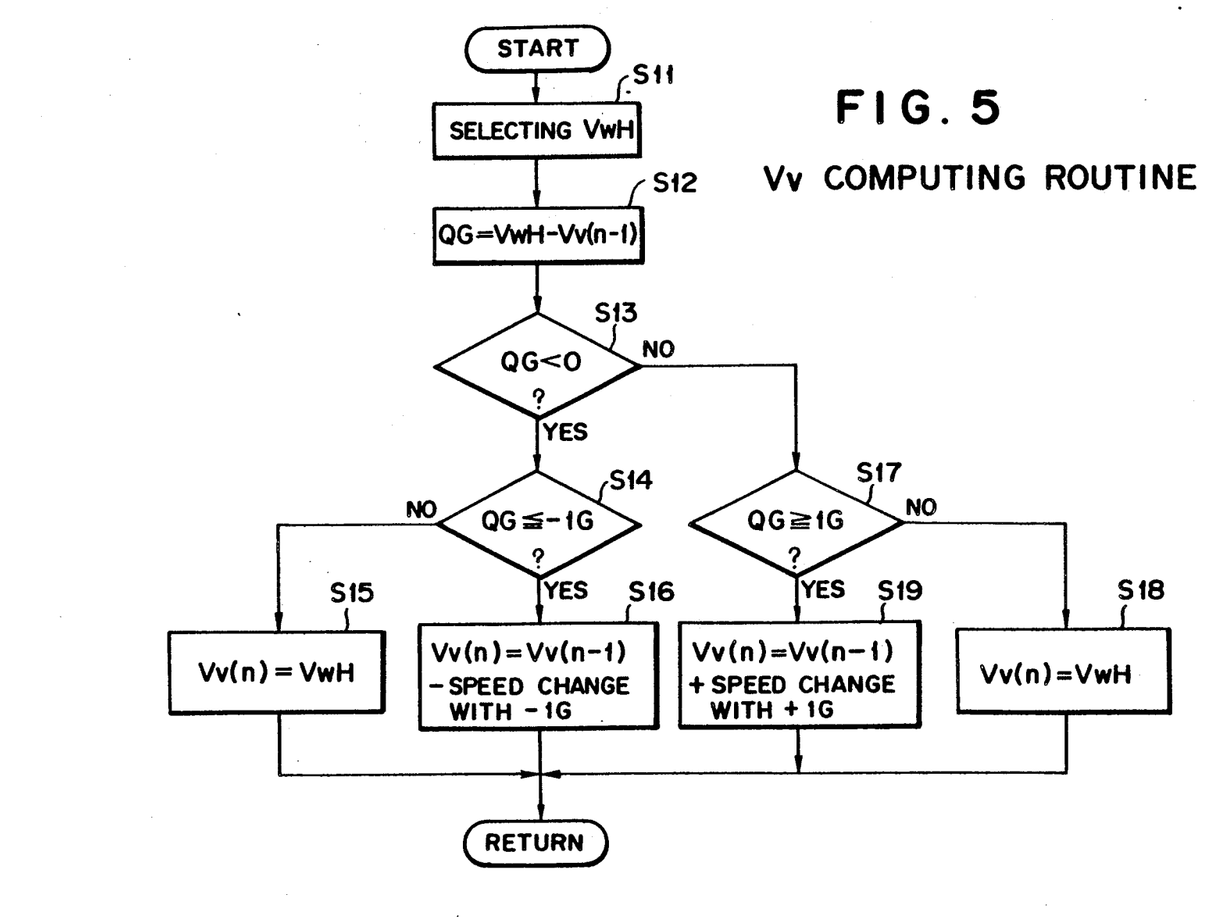
FIG. 5 is a flow chart showing the computed vehicle speed computing routine according to the embodiment of the present invention.

FIG. 5 is a flow chart illustrating the operations of the select-high circuit 14 and limiter circuit 15 which are incorporated in the computed vehicle speed Vv computing circuit 13 of FIG. 3. At step S11, the highest wheel speed VwH is selected; at the subsequent step S12, a value QG is set up which is obtained by subtracting the preceding computed vehicle speed Vv(n−1) from the highest wheel speed VwH. At step S13, a judgment is made as to whether QG is lower than 0, and if the result of the judgment is "YES", i. e., if QG represents a deceleration, then the process proceeds to step S14 where it is judged that QG represents deceleration; and if QG represents a deceleration which is gentler than −1G, then the process proceeds to step S15 where the current computed vehicle speed Vv(n) is set up to be equal to VwH. If QG represents a deceleration that is equal to or steeper than −1G, then at step S16, the current computed vehicle speed Vv(n) is set up by subtracting a speed with a deceleration of −1G from the preceding computed vehicle speed Vv(n−1). In case no judgment of deceleration was made at step S13, then the process proceeds to step S17 where the determination that QG represents an acceleration is made, and if QG represents an acceleration that is lower than +1G, then the process proceeds to step S18 where the current computed vehicle speed Vv(n) is set up to be equal to VwH. In case QG represents an acceleration that is equal to or higher than +1G, then at step S19, the current computed vehicle speed Vv(n) is set up by adding a speed with an acceleration of +1G to the preceding computed vehicle speed Vv(n−1). Of the foregoing steps S11 to S19, the step S11 represents the function of the select-high circuit 14 shown in FIG. 3., and the steps S12 to S19 represent the functions of the limiter circuit 15.

Figure 6:
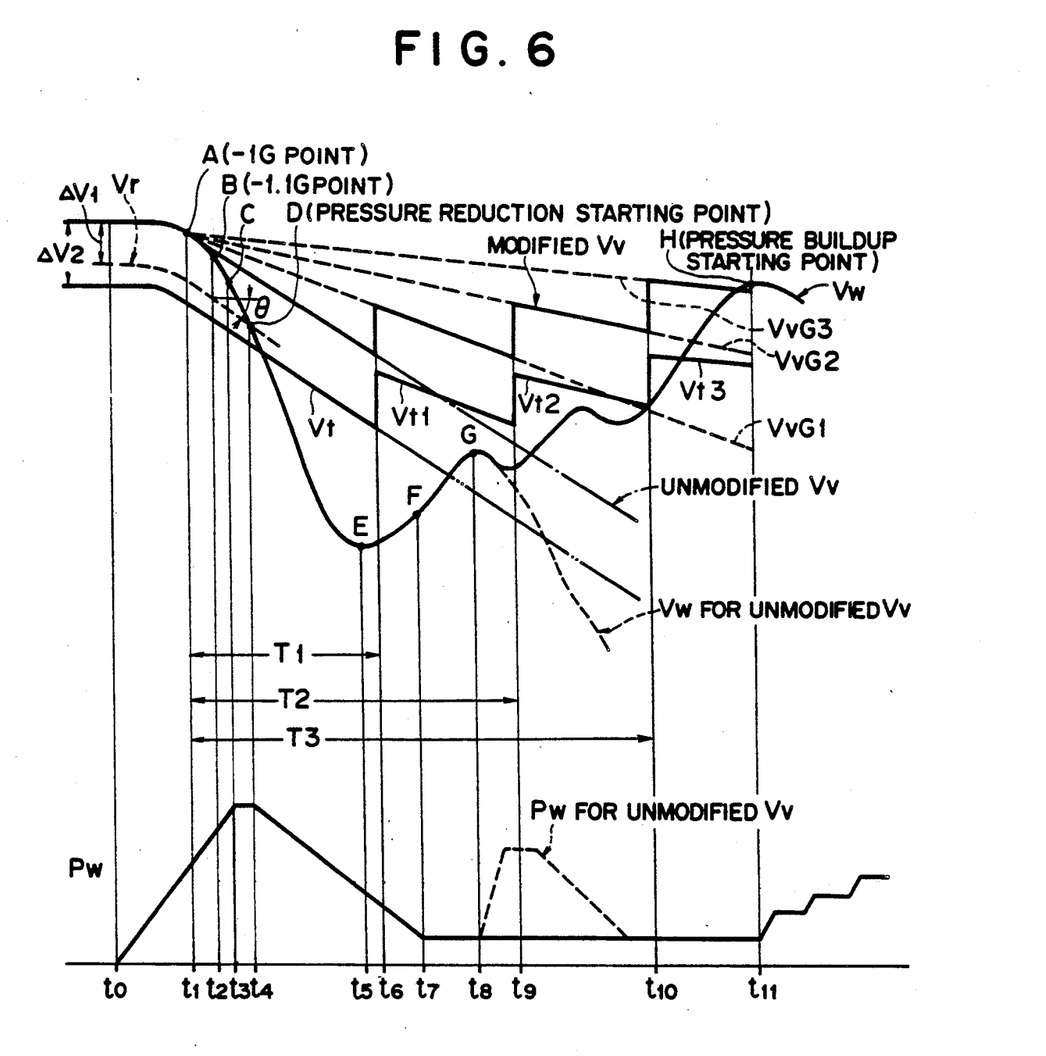
FIG. 6 is a view useful for explaining how control is effected according to the embodiment of the present invention.
Figure 7:
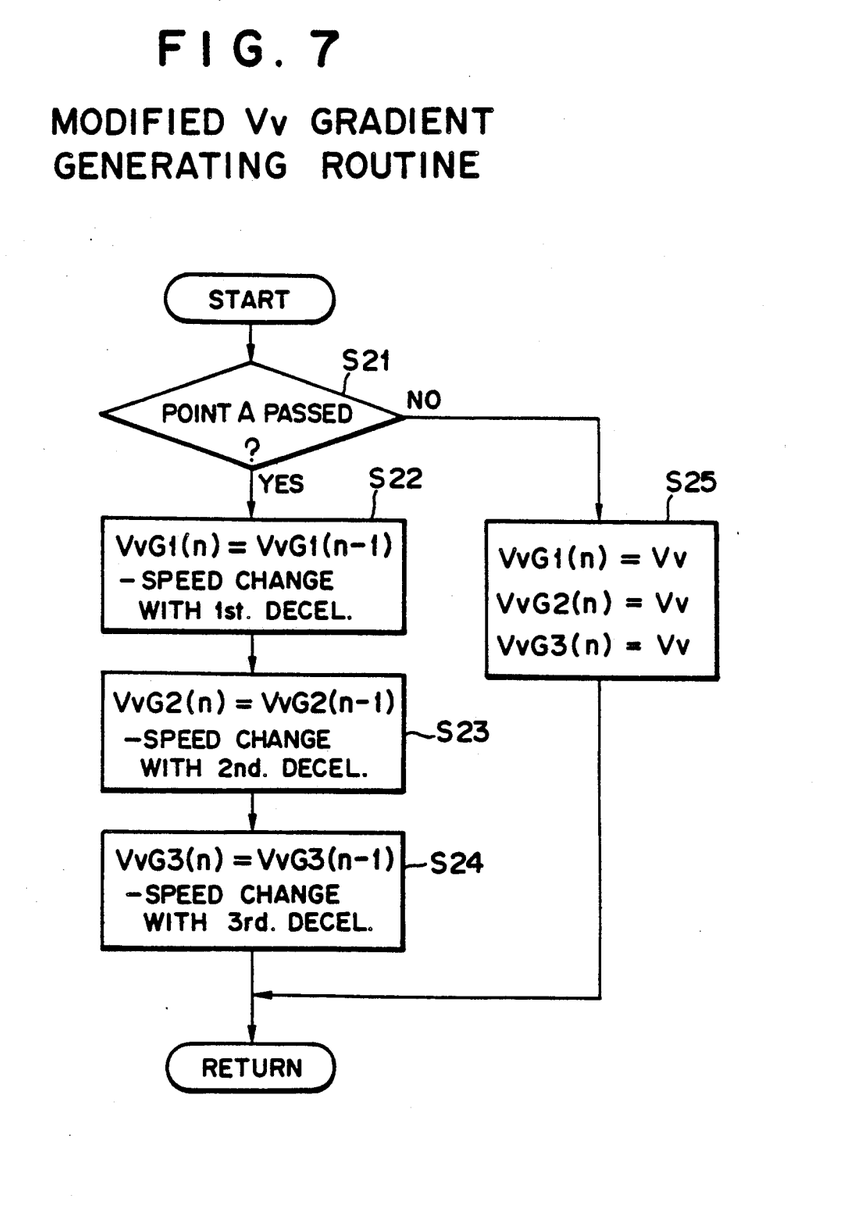
FIG. 7 is a flow chart showing the modified computed vehicle speed gradient generating routine according to the embodiment of the present invention.
Figure 8:
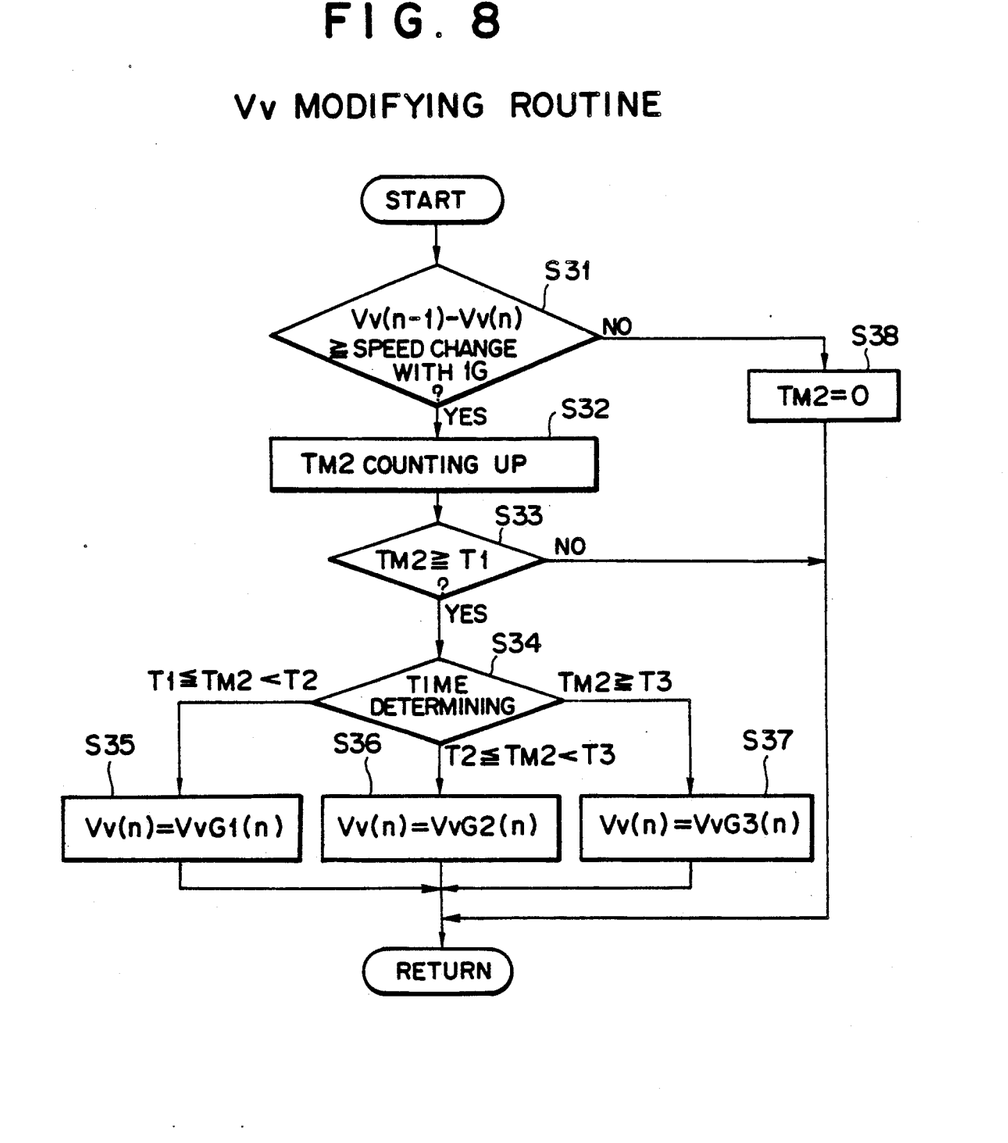
FIG. 8 is a flow chart showing the computed vehicle speed modifying routine according to the embodiment of the present invention.

FIGS. 7 and 8 are flow charts illustrating the operations for the modified Vv gradient generating circuit 16 and for Vv modifying circuit 17 which are incorporated in the Vv computing circuit 13 shown in FIG. 3. The control timing chart according to the embodiment shown in FIG. 6.

As shown in FIG. 6, the brake fluid pressure Pw is increased to rapidly build up from time t0 onward (normal mode) so that the wheel speed Vw is reduced.

At this time, the Vv gradient generating routine illustrated in FIG. 7 is executed to compute first, second and third modified vehicle speeds VvG1, VvG2 and VvG3 for modifying the computed vehicle speed Vv. More specifically, at step S21, judgment is made as to whether the computed vehicle speed Vv has passed through a point A where a deceleration of −1G occurs for the first time after the motor vehicle has been braked. Prior to time t1 in FIG. 6, the result of this judgment is "NO", and thus the process proceeds to step S25 where the current first to third modified vehicle speeds VvG1(n) to Vv3(n) are made to conform to the computed vehicle speed Vv.

From the point of time t1 when the deceleration of the computed vehicle speed Vv reaches the level of −1G, the result of the judgment at step S21 becomes "YES", and thus the process proceeds to step S22 where the current modified vehicle speed VvG1(n) is read out which is set up by subtracting a speed with a deceleration 1 (say −0.5G) from the preceding first modified vehicle speed VvG1(n−1). Similarly, at step S13, the current second modified vehicle speed VvG2(n) is read out which is set up by subtracting a speed with a deceleration 2 (say −0.3G) from the preceding second modified vehicle speed VvG2(n−1); and at step S14, the current third modified vehicle speed VvG3(n) is read out which is set up by subtracting a speed with a deceleration 3 (say −0.2G) from the preceding third modified vehicle speed VvG3(n−1). Then, the process returns to the start.

By repeating the above-described process, three modified deceleration gradient lines extending from the point A on the computed vehicle speed Vv line and above the reference deceleration gradient line having a deceleration gradient of −1G and representing the aforementioned three modified deceleration gradients −0.5G, −0.3G and −0.2G respectively are set up as lines representing the modified vehicle speeds VvG1, VvG2 and VvG3.

Furthermore, the Vv modifying routine shown in FIG. 8 is also executed. With this routine, first of all, judgment is made as to whether a speed obtained by subtracting the current computed vehicle speed Vv(n) from the preceding computed vehicle speed Vv(n−1) is equal to or higher than a speed with 1G. From the time t1 in FIG. 6, the result of this judgment becomes "YES", and thus the process proceeds to step S32 where counting-up of time TM2 set on a timer is started; and then the process proceeds to step S33 where with respect to the time TM2 set on the timer, judgment is made as to whether a predetermined period of time T1 of the time TM2 has elapsed. The result of this judgment is "NO"; thus the process returns to step S31; and similar operation is repeated. If the result of the judgment made at step S31 becomes "NO", then the time TM2 set on the timer is made to be equal to 0 (zero) at step S38.

To determine a point when reduction of the brake fluid pressure is started, the reference wheel speed Vr is set up which is lower by a predetermined amount $\Delta V1$ than and follows the aforementioned wheel speed Vw with such a speed difference. More particularly, the reference wheel speed Vr is set up in such a manner as to linearly decrease with a deceleration gradient $\theta$ from time t2 (point B) onward when the deceleration (negative acceleration) of the wheel reaches a predetermined threshold, say $-1.1G$. The brake fluid pressure is held from time t3 (point C) onward when the deceleration of the wheel reaches a predetermined threshold $-Gmax$.

As a result of the brake fluid pressure being held as mentioned just above, the wheel speed Vw is further decreased; at time t4, the wheel speed Vw becomes equal to the reference wheel speed Vr at a point D; and from the time t4 onward, reduction of the brake fluid pressure Pw is started. As a result of this brake fluid pressure reduction, the wheel speed Vw is changed from decrease to increase at time t5 (point E) when a low peak V1 thereof occurs. The reduction of the brake fluid pressure Pw is interrupted, and the pressure is held at the low-peak point t5 or at time t7 (point F) when the wheel speed Vw recovers up to a speed Vb which is higher than the low-peak speed V1 by an amount corresponding to 15% of the speed difference Y between the wheel speed Va at the pressure reduction starting point t4 and the low-peak speed V1(Vb=V1+0.15Y).

As mentioned above, by executing the computed vehicle speed Vv modifying routine illustrated in FIG. 8, the counting-up of the time TM2 set on the timer is started from the time t1 (step S32), and the computed vehicle speed Vv is successively modified to the first to third modified vehicle speeds VvG1 to VvG3 respectively at points of time when predetermined time periods T1, T2 and T3 (where T1<T2<T3) of the time TM2 elapse as counted up by the timer. More specifically, at time t6 in FIG. 6, the predetermined time period T1 elapses while the deceleration of the computed vehicle speed Vv remains at $-1G$, so that the result of the judgment made at step S33 in FIG. 8 turns out to be "YES", and thus the process proceeds to step S34. At the step S34, timing determination is effected, and since T1<TM2<T2 in this case, the process proceeds to step S35 where the current computed vehicle speed Vv(n) is changed to the current first modified vehicle speed VvG1(n), and the acceleration or deceleration follow-up limit for the subsequent computed vehicle speed Vv is set in the range from 1G to $-0.5G$. In this way, the computed vehicle speed Vv(n) is modified to the value VvG1(n) on the modified deceleration gradient line that is closest to the aforementioned reference deceleration gradient line at the point of time when the predetermined time period T1 elapses, and thus the deceleration follow-up limit for the subsequent computed vehicle speed Vv is modified to conform to this modified deceleration gradient line VvG1.

At time t8 in FIG. 6, a high peak of the wheel speed Vw occurs which is higher than the threshold speed Vt that is lower by the predetermined amount $\Delta V2$ than and follows the conventional or unmodified computed vehicle speed Vv with such a speed difference; thus, with the conventional anti-lock control scheme, the aforementioned pressure buildup conditions (1) and (2) are satisfied at the time t8 so that pressure buildup is started as indicated by a broken line in FIG. 6 and the four wheels tend to be subjected to early-locking. In contrast thereto, according to this embodiment of the present invention, at time t6, the computed vehicle speed Vv is modified, and the threshold level, which is lower by the predetermined amount $\Delta V2$ than and follows the Vv with such a speed difference, is also modified to Vt1; and since the wheel speed Vw is not higher than the threshold level Vt1, the brake fluid pressure remains constant and is not increased.

At time t9, the condition that the deceleration of the computed vehicle speed Vv modified at the step S35 is $-0.5G$, has persisted for the period of time (T2−T1) since the point of time t6; thus, the result of timing determination at step S34 in FIG. 8 turns out to be such that T2≦TM2<T3. Consequently, the current computed vehicle speed Vv(n) is changed to the current modified vehicle speed VvG2(n) on the line representing the modified deceleration gradient $-0.3G$, and the acceleration or deceleration follow-up limit for the subsequent computed vehicle speed Vv is set in the range from 1G to $-0.3G$.

Similarly, at time t10, the condition that the deceleration of the computed vehicle speed Vv modified at the step S36 is $-0.3G$, has persisted for the period of time (T3−T2) since the point of time t9; thus, the process proceeds, via the step S34, to step S37 where the current computed vehicle speed Vv(n) is changed to the current third modified vehicle speed VvG3(n) on the line representing the modified deceleration gradient of $-0.2G$, and the acceleration or deceleration follow-up limit for the subsequent computed vehicle speed Vv is set to be in the range from 1G to $-0.2G$.

As the computed vehicle speed Vv is successively changed to the values VvG1, VvG2 and VvG3 on the three lines representing modified deceleration gradients ($-0.5G$, $-0.3G$, $-0.2G$) as mentioned above, the threshold level Vt, which is lower by the predetermined amount $\Delta V2$ than and follows the Vv with such a speed difference, is also successively changed to Vt1, Vt2 and Vt3, i.e., becomes successively higher; thus, the wheel speed Vw, on the way toward recovery, does not go above the threshold level Vt, and no buildup of the brake fluid pressure is started even if a high peak of the wheel speed Vw occurs as a result of temporal and repetitive increase and decrease in the wheel speed Vw.

At a point of time t11 in FIG. 6, it first happens that a high peak of the wheel speed Vw is reached (point H) while the latter is higher than the threshold level Vt3, so that both of the aforementioned pressure buildup starting conditions 1 and 2 are established; thus, buildup of the brake fluid pressure Pw is started. The pressure buildup from the time t11 onward is effected in such a manner that the brake fluid pressure Pw is gradually increased while being alternately and repetitively increased and held by turning on and off, mincingly or with relatively short intervals, hold signals for actuating the pressure increasing valves. In this way, the wheel speed Vw is reduced.

At and after the time t11 when the second cycle of control is started, the buildup of the brake fluid pressure is controlled as described above, so that a possibility that the four wheels tend to be locked, is precluded; hence, it is only for the first cycle of control from the point of time when the brake is engaged (time t0) to the point of time when the first pressure buildup starting point (time t11) that the modified Vv gradient generating routine shown in FIG. 8 and Vv modifying routine shown in FIG. 5 are applied.

As will be appreciated from the above discussion, according to the embodiment of the present invention, three different modified deceleration gradient lines with three different modified deceleration gradients (say $-0.5G$, $-0.3G$, $-0.2G$) corresponding to a plurality of road surface friction coefficients are established at the point A when the deceleration of the computed vehicle speed Vv becomes equal to the reference deceleration gradient $-1G$ for the first time after the brake has been engaged; when the deceleration of the computed vehicle speed Vv has persisted along the line representing the reference deceleration gradient ($-1G$) for a predetermined period of time T1, the computed vehicle speed Vv(n) occurring at that time is changed to a value VvG1(n) on a line representing a modified deceleration gradient ($-0.5G$) which is closest to the aforementioned reference deceleration gradient ($-1G$) line at the point of time when the predetermined period of time T1 elapsed; the deceleration follow-up limit for the subsequent computed vehicle speed Vv is changed to the modified deceleration gradient ($-0.5G$) line; similar modification procedures are performed successively; and in this way, even when the speeds of the four wheels running on a road surface with a low friction coefficient $\mu$ are dropped at the same time, it is possible to postpone initiation of pressure buildup until the wheel speed is sufficiently recovered, thereby avoiding abrupt and great drop of the wheel speed Vw and preventing the wheels from being subjected to early-locking.

While the present invention has been illustrated and described with respect to specific embodiments thereof, it is to be understood that the invention is by no means limited thereto but encompasses all changes and modifications which will become possible within the scope of the appended claims.

We claim:

1. An anti-lock control system for motor vehicles, comprising:
   means for computing a computed vehicle speed based on respective wheel speeds of a motor vehicle when said motor vehicle is braked, said computed vehicle speed having a predetermined acceleration or deceleration follow-up limit;
   means for setting up a threshold speed which is lower than and follows said computed vehicle speed in a predetermined relationship therewith;
   means for causing brake fluid pressure to be increased when the wheel speed to be controlled, which has been decreased through a braking operation, is changed from decrease to increase as a result of reduction and subsequent holding of the brake fluid pressure and goes above said threshold speed and reaches a high peak or a level close thereto; and
   means for modifying said computed vehicle speed to follow a deceleration gradient line with a gentler gradient than a reference deceleration gradient line representing a predetermined acceleration or deceleration follow-up limit of said computed vehicle speed with respect to the wheel speed when the condition that said computed vehicle speed follows said reference deceleration gradient line has persisted for a predetermined period of time during a control cyclic period from a point of time when the braking operation is started to a point of time when the brake fluid pressure is increased for the first time after the brake fluid pressure is reduced through said braking operation, thereby increasing said threshold speed.

2. An anti-lock control system according to claim 1, wherein said threshold speed is lower by a predetermined amount $\Delta V$ than said computed vehicle speed.

3. An anti-lock control system according to claim 2, wherein said predetermined amount $\Delta V$ is equal to 5 Km/h.

4. An anti-lock control system for motor vehicles, comprising:
   means for computing a computed vehicle speed based on respective wheel speeds of a motor vehicle when said motor vehicle is braked, said computed vehicle speed having a predetermined acceleration or deceleration follow-up limit;
   means for setting up a threshold speed which is lower than and follows said computed vehicle speed in a predetermined relationship therewith;
   means for causing a brake fluid pressure to be increased when the wheel speed to be controlled, which has been decreased through a braking operation, is changed from decrease to increase as a result of reduction and subsequent holding of the brake fluid pressure and goes above said threshold speed and reaches a high peak or a level close thereto;
   means for setting up at least one modified deceleration gradient line having a different gradient gentler than that of a reference deceleration gradient line representing a predetermined deceleration follow-up limit of said computed vehicle speed with respect to the wheel speed during a cyclic period from a point of time when the braking operation is started to a point of time when the brake fluid pressure is increased for the first time after the brake fluid pressure is reduced through the braking operation;
   means arranged, when the condition that said computed vehicle speed follows said reference deceleration gradient line during the braking operation has persisted for a predetermined period of time, to change said computed vehicle speed to a value on that one of said at least one modified deceleration gradient line which is adjacent to said reference deceleration gradient line when said predetermined period of time has elapsed, and also to change the deceleration follow-up limit of the subsequent computed vehicle speed to said modified deceleration gradient line close to said reference deceleration gradient line.

5. The anti-lock control system according to claim 4, wherein said reference deceleration gradient line has a gradient of $-1G$.

* * * * *